April 16, 1968            W. P. LUCAS            3,377,881

FOOT CONTROL AND ADJUSTMENT LINKAGE

Filed March 14, 1966                                           3 Sheets-Sheet 1

INVENTOR
WILLIAM P. LUCAS
BY M. B. Tasker
ATTORNEY

April 16, 1968 W. P. LUCAS 3,377,881
FOOT CONTROL AND ADJUSTMENT LINKAGE
Filed March 14, 1966 3 Sheets-Sheet 2

FIG. 2

INVENTOR
WILLIAM P. LUCAS
BY M. B. Tasker
ATTORNEY

April 16, 1968 W. P. LUCAS 3,377,881
FOOT CONTROL AND ADJUSTMENT LINKAGE
Filed March 14, 1966 3 Sheets-Sheet 3

INVENTOR
WILLIAM P. LUCAS
BY M. B. Tasker
ATTORNEY

United States Patent Office 3,377,881
Patented Apr. 16, 1968

3,377,881
FOOT CONTROL AND ADJUSTMENT LINKAGE
William P. Lucas, Stratford, Conn., assignor to United Aircraft Corporation, East Hartford, Conn., a corporation of Delaware
Filed Mar. 14, 1966, Ser. No. 541,444
12 Claims. (Cl. 74—512)

This invention relates to improved foot-operated controls for aircraft of the type having two coacting pedals operated by the pilot which, in the case of an airplane, control a rudder for providing directional control of the airplane in flight and may control the main wheel brakes for providing directional control on the ground. In the case of a helicopter the controls would be identical in construction. If it were a helicopter of the single-lift-rotor type the pedals would adjust the blade pitch of an antitorque rotor for directional control in flight instead of a rudder.

In such foot-operated controls it is desirable that the pedals move fore and aft at a constant distance above the floor and that the pedals be maintained at all times at right angles to the fore and aft centerline of the aircraft.

It is an object of this invention to provide improved foot-operated controls having the above-mentioned characteristics which are extremely simple and hence much lighter in weight than those presently in use.

Another object of this invention is to provide improved means for adjusting the operating position of the pedals to accommodate pilots having different leg lengths.

Still another object of this invention is the provision of such improved adjusting mechanism for changing the operating position of two coacting pedals in which adjustment may be made while the aircraft is in flight without interferring with the use of the pedals to control the aircraft.

A further object of this invention is to provide foot-operated controls as above outlined in which two pedals are mounted on a parallelogram linkage and the movement of the coacting pedals to suit the length of the pilot's legs is effected by an actuating device which is mounted on and moves with the parallelogram linkage, thus resulting in a very simple and lightweight mechanism.

A still further object of this invention is the provision of an actuating device for the above stated purpose which includes a set of secondary linkages, one for each pedal, which are carried by the main parallelogram linkage which mounts the pedals.

A still further object of this invention is generally to improve foot-operated mechanisms for directional control of aircraft.

These and other objects and advantages of the invention will become apparent or will be pointed out in connection with the following detailed description of a typical embodiment of the invention shown somewhat diagrammatically in the accompanying drawings.

In these drawings:

FIGURE 2 is a view of the controls of FIG. 1 as seen from the pilot's seat;

Figure 1:
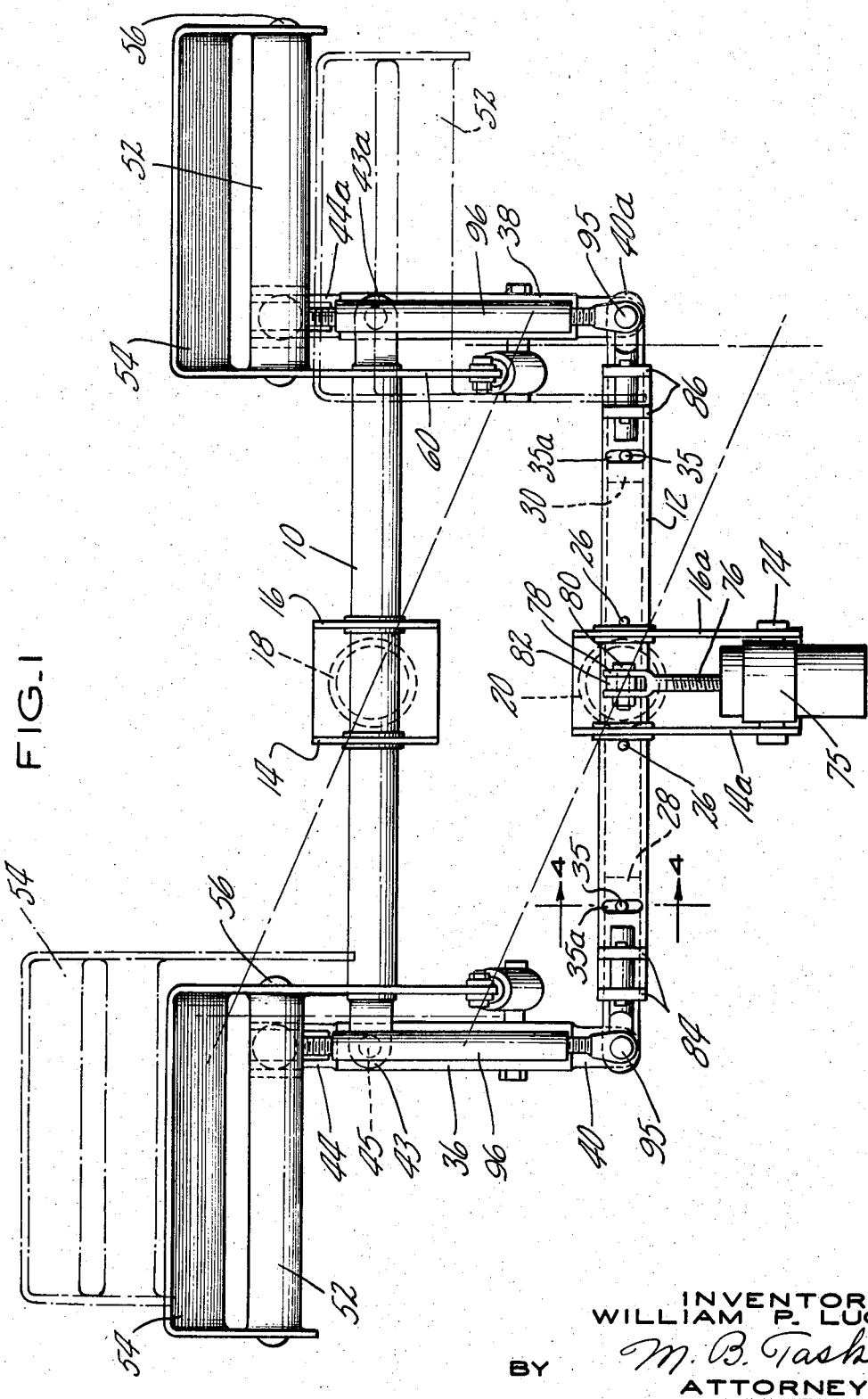
FIGURE 1 is a plan view of the improved means for the directional control of an aircraft both in flight and on the ground.
Figure 3:
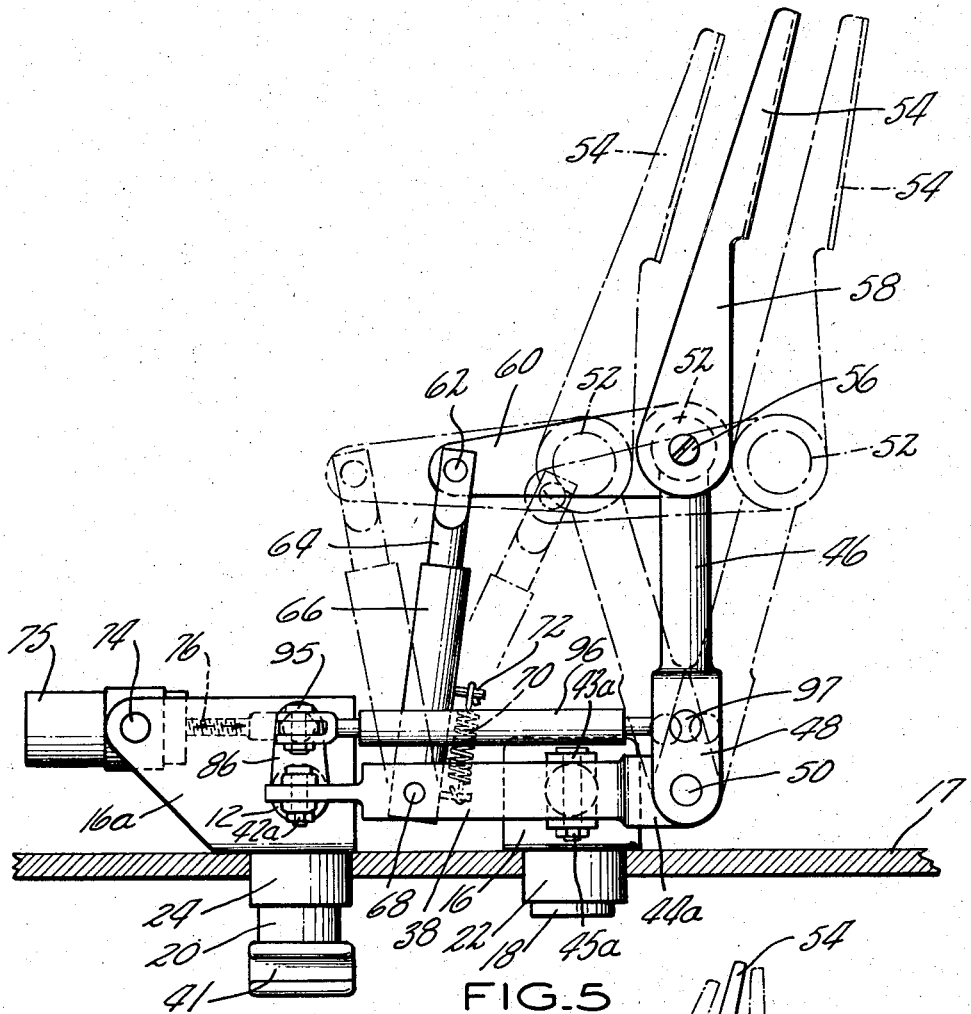
FIGURE 3 is an end view of the controls showing in dotted lines fore and aft adjusted positions of the pilot operated pedals.
Figure 4:
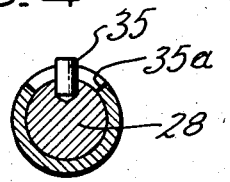
FIGURE 4 is a cross-sectional view taken on line 4—4 of FIGURE 1.

As shown in FIGS. 1 to 3, the control pedal assembly includes fore and aft located transverse yoke members 10 and 12 which are mounted in the parallel upright arms 14, 16 and 14a, 16a of fore and aft spindle members 18 and 20 (FIG. 3) which are supported for pivotal movement in the cockpit floor 17 by suitable antifriction bearings 22 and 24. Forward yoke 10 is rigidly and nonrotatably secured in parallel arms 14, 16, whereas aft yoke 12 has a central portion which is free to rotate arms 14a and 16a for reasons hereinafter explained.

The rotatable portion of yoke member 12, which is tubular, is shown herein as fixed against lateral displacement relative to upright arms 14a, 16a by pins 26 (FIGS. 1 and 2) which are carried by the yoke member and abut the arms 14a, 16a. Short stub shafts 28, 30 are fitted into the tubular ends of the rotatable portion of yoke member 12 and have bifurcated ends 32, 34 extending beyond the ends of the central tubular portion of the yoke member. These stub shafts are held against axial displacement relative to the central tubular portion of the yoke by pins 35 carried by the inner ends of the stub shafts and projecting radially through peripheral slots 35a in the tubular portion of yoke 12. Thus the opposite ends of the tubular portion of yoke 12 are journalled on stub shafts 28, 30 for limited movement as determined by the length of the slots 35a.

The left- and right-hand ends of yoke members 10 and 12 are pivotally connected by tie bars 36, 38, respectively, (FIG. 1) which are identical. Left-hand tie bar 36, for example, is a tubular member having a tongue 40 at its aft end which is connected between the furcations of the bifurcated end 32 of yoke 12 by a pivot bolt 42. At its forward end tie bar 36 extends through and beyond furcations 43 at the left-hand end of yoke member 10 and terminates in a bifurcated end 44. Tie bar 36 is pivotally connected to the bifurcated end of yoke 10 by a pivot bolt 45. Tie bar 38 similarly has an aft tongue 40a pivoted on a bolt 42a between the furcations of the bifurcated end 34 of yoke member 12. At its forward end bar 38 extends through and beyond furcations 43a at the right-hand end of yoke 10 where it is pivoted on a bolt 45a (FIG. 3). Bar 38 terminates in a bifurcated end 44a.

It will be evident that yoke members 10, 12 and tie bars 36, 38 form a parallelogram of pivoted links which is movable about the vertical axes of spindles 18, 20 as indicated by dot and dash lines in FIG. 1 which show one extreme position of the parallelogram linkage when it is turned in clockwise direction.

The two pilot operated pedals are carried by the forwardly extended ends of tie bars 36, 38. These pedals are allochiral members, i.e. they are identical except that one is left-hand and the other is right-hand. Each consists of an upstanding arm 46 having a somewhat elongated bifurcated lower end 48 which is pivotally connected by a bolt 50 to the forwardly extended bifurcated end 44, 44a of its associated tie bar 36 or 38. Each pivoted arm 46 has an integral pedal bar 52 (FIG. 1) extending at right angles therefrom which carries a toe treadle 64 for pivotal movement about a bolt 56 which extends through the pedal bar and through opposite side members 58 of the toe treadle 54. One side member 58 of each toe treadle, the one adjacent the arm 46, is in the form of a bell crank having its angularly related arm 60 extended aft and pivotally connected at 62 (FIG. 3) to the upper end of a piston rod 64 which reciprocates in a hydraulic brake cylinder 66 pivoted at its lower end at 68 to the associated tie bar 36 or 38. A tension spring 70 connects the lower end of the cylinder with a pin 72 carried by piston rod 64 which pin moves in a slot (not shown) in the skirt of cylinder 66. This somewhat diagrammatic showing represents the usual hydraulic brake master cylinder assembly. The spring 70 constantly biases the toe treadle into its normal brake-off position in which the pin 72 engages the lower extremity of the slot and the piston is in the bottom end of the cylinder.

Fore and aft adjustment of the position of the pedal bars 52 and their associated toe treadles 54 to accommodate pilots of different stature is accomplished by a very simple and compact mechanism which is one of the principal features of this invention. Upstanding parallel arms 14a, 16a which form the support for yoke member 12 are extended aft, as shown in FIGS. 1 and 3 to provide a pivotal support for the trunnions 74 of a reversible motor 75, the axial shaft of which is threaded to receive the threaded end of a clevis rod 76. The clevis end of this rod is pivotally connected by a bolt 80 (FIG. 1) to the free end of a short radial arm 82 on the central rotatable portion of yoke member 12 at the midpoint thereof. This rotatable tubular portion of yoke member 12 also carries pairs of short radial arms 84, 86 at its opposite ends in the ends of which arms stub shafts 88, 90, respectively, are journalled, cotter pins 92 being provided to prevent axial displacement of the shafts relative to the arms. Each stub shaft has its outer projecting end formed with a tongue 94 which is pivotally connected by a bolt 95 to the aft end of an adjustable clevis rod 96, the forward end of which is pivoted at 97 (FIG. 3) between the furcations 48 of its associated arm 46 at a point spaced above the pivot 50 of this upstanding arm. It will be noted that tie rods 36, 38 and clevis rod 96, 96 are of substantially equal length in the full-line position of pedal arm 46 and that the length of arms 84, 86 equals the distance on arms 46, 46 between pivots 50 and 97, so that at the left-hand end of yokes 10, 12 (FIG. 1) there is provided a secondary linkage comprising generally parallel fore and aft extended links 36, 96, aft connecting link 84 and a generally parallel forward link comprising that portion of arm 46 between pivots 50 and 97. At the right-hand end of yokes 10 and 12 there is provided a similar secondary linkage comprising links 38, 96, aft links 86 and a parallel forward link comprising that portion of arm 46 between pivots 50 and 97.

Considering the pedal assembly above described as a directional control and brake control system for a helicopter, it will be seen that bodily forward and aft movements of the pedals will result if either pedal is pushed forward by the pilot from the position shown in FIG. 1 and that these movements will be translated to the blade pitch changing mechanism of the antitorque rotor by the usual rod which may, for example, be attached to the bell crank 41 on spindle 20.

Also depression of the toe treadle 54 of either pedal bar will result in the compression of the fluid in the corresponding cylinder 66 as the piston rises in the cylinder and the actuation of the main wheel brake associated with that particular cylinder to provide directional control for the helicopter on the ground.

The adjustment of normal pedal position to accommodate pilots of different stature results from the rotation of the central tubular portion of yoke 12, whether by mechanical means or, as shown, by electrical means, thus altering the shape of the secondary quadrilateral linkage system including, for example, tie bar 38 and clevis rod 96 as viewed in FIG. 3 which results in swinging the upstanding arm 46 fore or aft about its pivot 50 and with it the pedal bar 52.

Figure 5:
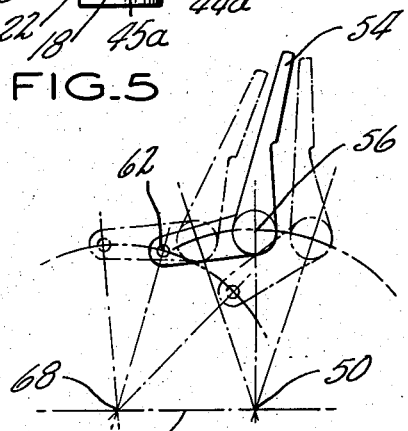
FIGURE 5 is a diagrammatic view showing the variation in treadle angle relative to the pedal arm in the extreme fore and aft positions of adjustment of the latter.

To permit a pilot's foot to rest comfortably against both the pedal bar 52 and toe treadle 54, the side members 58 may be inclined with respect to the floor. This inclination must be varied slightly for pilots of different stature. The variation can be accomplished in conjunction with the adjustments of the pedals by constructing the length of arm 46 between bolts 50 and 56 slightly longer than the relaxed length of hydraulic cylinder 66 and piston 64 and/or by constructing the length of arm 60 slightly shorter than the distance between point 68 and bolt 50. The inclination will then be somewhat greater for the pilot with short legs as is illustrated in FIG. 5.

From the above description of a typical embodiment of the invention, it will be evident that a very compact system has been provided for directional control of an aircraft both in flight and on the ground which is much lighter than prior mechanisms for the purpose.

It will also be evident that by mounting the pedal position adjusting mechanism on the yokes carrying the pedals themselves a very reliable and compact mechanism results with fewer parts than would otherwise be required which effects an additional saving in weight.

In addition it will be seen that the adjustment of the pedal positions may take place at any time while the pedals are being used to control the directional flight of the aircraft.

The mechanism above described, while being designed for a single-lift-rotor type helicopter in which it has particular advantages, can be used in any aircraft wherein a lightweight compact pedal system is required.

While only one set of pedals has been shown herein, it will be understood that these pedals may be suitably tied in with a second set for a co-pilot so that both sets operate in unison. The co-pilot's pedals, however, do not usually have the brake control mechanism shown herein. A three-position switch on each of the pilot's and co-pilot's console provides for pedal adjustment to suit individual pilot and co-pilot. Positioning the switch on either console from neutral energizes the electric motor to position the pedals associated with that switch in the direction of the switch motion. The adjustment range provided is plus or minus three inches from the neutral position of the pedals at a constant rate of 0.25 inch per second.

While only a single embodiment of the invention has been illustrated and described herein, it will be understood that numerous changes may be made in the construction and arrangement of the parts without departing from the scope of the invention as defined in the following claims.

I claim:

1. The combination in a pedal control mechanism of a base structure, a pair of laterally extending yoke members arranged in fore-and-aft spaced relation and each pivoted at its midpoint on said base structure, a tie bar at each side of said base structure having pivotal connection with adjacent ends of said yoke members, said yoke members and said tie bars forming a primary parallelogram system, pedal means at each side of said base, each including an upstanding arm having a pivotal connection at its lower end with said parallelogram system, and means for holding said pedal arms in any of a plurality of fore-and-aft positions of adjustment about their pivotal connections including two secondary quadrilateral linkage systems, one associated with each of said pedals.

2. The combination of claim 1 in which each secondary linkage system includes one of said tie bars and a portion of the pedal arm pivoted thereto.

3. The combination of claim 1 in which each secondary quadrilateral system includes one of said tie bars, a thrust link pivoted at its forward end to its associated pedal arm at a point spaced from the pivot of said arm, and an actuating arm pivoted for movement about the axis of said aft yoke member having a pivotal connection with the aft end of said thrust link.

4. The combination of claim 3 in which said actuating arms are mounted on a tubular portion of said aft yoke member, and means are provided for oscillating said tubular portion for jointly actuating said thrust links.

5. The combination in a pedal control mechanism of a base structure, a pair of laterally extended yoke members arranged in fore-and-aft spaced relation and each pivoted at its midpoint on said base structure for movement about a generally vertical axis, a tie bar at each side of said base having pivoted connections with adjacent ends of said yoke members and extended forward beyond the foremost yoke member, said yoke members and said tie bars forming a parallelogram system, pedal means at each side of said base, each including an upstanding arm having a pivotal connection at its lower end with the extended end of one of said tie bars, said arms having horizontal pedals at their upper ends for engagement by the pilot's feet, and means carried by said parallelogram system for adjusting said arms jointly about the pivots at their lower ends and for holding them in different positions of adjustment for pilots of different stature.

6. The combination of claim 5 in which the pedal adjusting and holding means carried by the parallelogram system comprises a quadrilateral linkage system at each side of the base, each of which includes one of said tie bars and a portion of the connected pedal arm adjacent its pivotal connection.

7. The combination of claim 5 in which the pedal adjusting means consists of a central tubular portion of said aft yoke member which is rotatable through a limited annular range about the longitudinal axis of said yoke member, and said tubular portion is provided with radial arms at its opposite ends which are pivotally connected to the aft ends of thrust links, the forward ends of which are connected to said pedal arms at points spaced from the pivotal supports for the latter.

8. The combination of claim 7 in which the midpoint pivot for said aft yoke member carries a pair of upstanding plates in which said central tubular portion is journalled, said tubular portion having a radial arm located between said plates, and reversible actuating means is mounted on said plates having an operative connection with said arm for oscillating said tubular member about its longitudinal axis for adjusting said pedals in fore-and-aft directions.

9. The combination of claim 8 in which the actuating means comprises a reversible electric motor.

10. The combination of claim 9 in which the motor is mounted between said plates on trunnions and its shaft has a screw-threaded connection with one end of a clevis rod, the clevis end of which is pivotally connected with the free end of said radial arm on the tubular portion of said yoke member.

11. The combination in a pedal control mechanism of a base structure, a pair of laterally extending yoke members arranged in fore-and-aft spaced relation and each pivoted at its midpoint on said base structure, a tie bar at each side of said base structure having a pivotal connection with adjacent ends of said yoke members, said yoke members and said tie bars forming a primary parallelogram system, pedal means at each side of said base, each including an upstanding arm having a pivotal connection at its lower end with said parallelogram system and carrying a pedal bar at its free end, means for adjusting said pedal arms in unison in fore-and-aft directions about their pivot points to accommodate pilots of different stature, treadle means pivotally mounted on the upper ends of said pedal arms, each having an angularly related actuating arm, and quadrilateral linkage means at each side of said base structure for adjusting the angularity of said treadle relative to said pedal arms simultaneously with the angular adjustment of said pedal arms including said pedal arm, a link pivotally mounted on said tie bar having its free end connected to the actuating arm of its associated treadle, said actuating arm, and the portion of said tie bar between the pivot point of said link and the pivot point of said pedal.

12. The combination of claim 11 in which the length of the links comprising the quadrilateral linkage are so chosen that adjustment of the pedal arms in an aft direction results in an additional movement of said treadles about their pivots in a forward direction.

References Cited

UNITED STATES PATENTS

| | | | |
|---|---|---|---|
| 2,478,546 | 8/1949 | Pickens et al. | 244—86 |
| 2,478,882 | 8/1949 | Wells | 244—86 |
| 2,516,397 | 7/1950 | Kress et al. | 74—478 |

FRED C. MATTERN, JR., *Primary Examiner.*

F. D. SHOEMAKER, *Assistant Examiner.*